No. 769,605. PATENTED SEPT. 6, 1904.
R. A. HAMMOND & F. E. WALDEN.
WRENCH.
APPLICATION FILED DEC. 18, 1903.
NO MODEL.
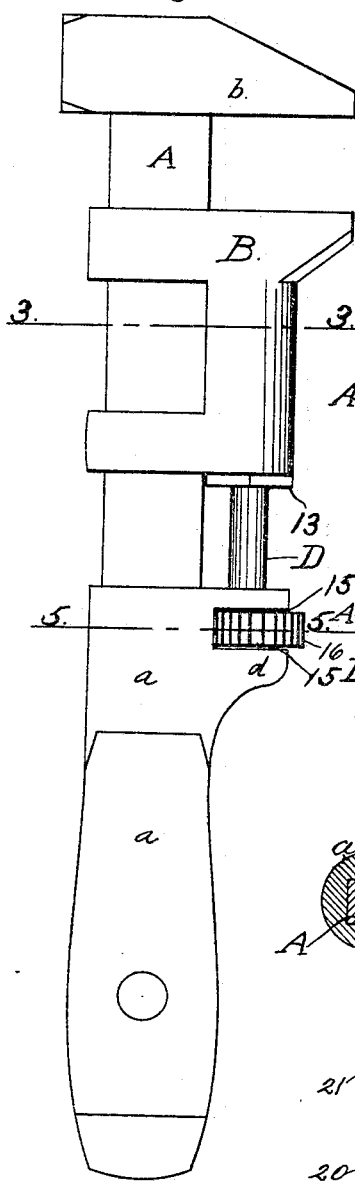
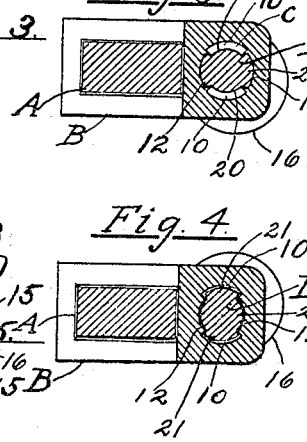
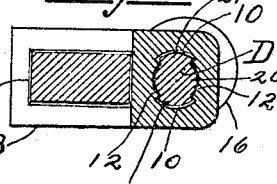
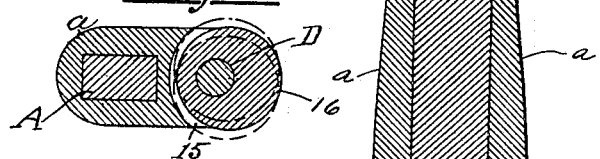
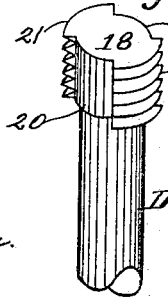
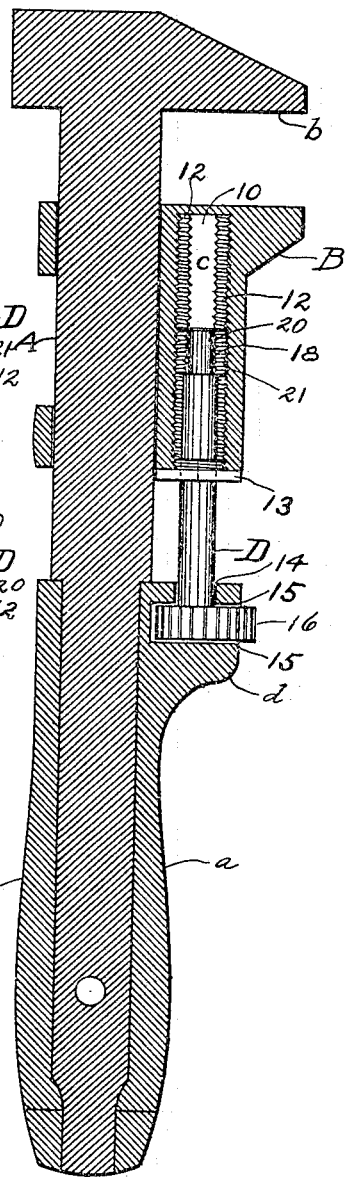
Witnesses.
Henry H. Sullivan.
J. E. Maloney.
Inventors.
Robert A. Hammond
Frederick E. Walden
by P. E. Teschemacher
Atty.

No. 769,605.

Patented September 6, 1904.

UNITED STATES PATENT OFFICE.

ROBERT A. HAMMOND, OF SANDWICH, AND FREDERICK E. WALDEN, OF WORCESTER, MASSACHUSETTS, ASSIGNORS, BY DIRECT AND MESNE ASSIGNMENTS, TO HAMMOND MANUFACTURING COMPANY, OF EASTPORT, MAINE, A CORPORATION OF MAINE.

WRENCH.

SPECIFICATION forming part of Letters Patent No. 769,605, dated September 6, 1904.

Application filed December 18, 1903. Serial No. 185,763. (No model.)

*To all whom it may concern:*

Be it known that we, ROBERT A. HAMMOND, of Sandwich, in the county of Barnstable, and FREDERICK E. WALDEN, of Worcester, in the county of Worcester, State of Massachusetts, citizens of the United States, have invented certain new and useful Improvements in Wrenches, of which the following is a specification.

Our invention relates to nut and pipe wrenches, and has for its object to provide a wrench of simple construction in which the movable jaw can be easily and quickly adjusted on the shank and securely locked when moved to the required position and in which the jaw-locking device will be held fast either in the position which it occupies when locking the movable jaw or when moved in the opposite direction to unlock the same and permit it to slide freely on the shank.

With these ends in view our invention consists in certain novel features and details of construction, as will be hereinafter fully described and claimed.

In the accompanying drawings, Figure 1 is a side elevation of a wrench constructed in accordance with our invention. Fig. 2 is a longitudinal vertical section of the same. Fig. 3 is a transverse section of the same on the line 3 3 of Fig. 1, showing the position of the jaw-locking spindle when the movable jaw is locked. Fig. 4 is a similar section showing the position of the jaw-locking spindle when the movable jaw is unlocked. Fig. 5 is a transverse section on the line 5 5 of Fig. 1. Fig. 6 is an enlarged perspective view of the jaw-locking spindle.

In the said drawings, A represents the shank or stem of the wrench, which is fitted to a handle *a* of any suitable or approved construction and is provided at its upper end with an integral fixed jaw *b*.

B is the movable jaw, which slides on the shank A and is bored out in the direction of its length to form an aperture *c*, the walls of which are divided longitudinally into alternate plain and screw-threaded sections 10 12, as shown in Fig. 2. Into this aperture *c* extends an axially-oscillating locking-spindle D, which passes through a split bushing 13, screwed into the lower end of the aperture *c*, whereby it is steadied and maintained at all times in its proper central position within said aperture. The lower end of the spindle D is supported in a suitable bearing 14, formed in a laterally-projecting portion *d* of the handle *a*, an open slot 15 being formed in the projection *d*, in which is placed a thumb-wheel 16, eccentrically secured to the spindle D, as shown in Fig. 5, the thumb-wheel so arranged forming a cam which when turned to oscillate the spindle in either direction will be brought into contact with the end wall of the slot 15, which thus forms a stop and serves to limit the axial rotation of the spindle to a quarter-revolution. The upper end 18 of this spindle, which is slightly enlarged, is screw-threaded in sections—that is, it is divided longitudinally into alternate plain and screw-threaded sections 20 21 to correspond with those in the aperture *c* of the movable jaw B, whereby when the spindle is turned by the cam-shaped thumb-wheel 16 to the limit of its movement in one direction, as determined by the contact of one side of said wheel with the end wall of the slot 15, the threaded sections of said spindle end will register with the plain or unthreaded sections of the walls of the aperture *c*, as shown in Fig. 4, when the jaw B will be free to be moved up or down on the shank A and spindle D to bring it into the desired position with relation to the fixed jaw *b*, after which the spindle is turned a quarter-revolution in the opposite direction, as again determined by the contact of the opposite side of the thumb-wheel 16 with the end wall of the slot 15, which movement of the spindle causes its threaded sections to engage the threaded sections of the aperture *c*, as shown in Figs. 2 and 3, thus securely locking the movable jaw in its adjusted position, the locking-spindle being itself locked in this position, or when at the end of its movement in the opposite direction to unlock the jaw, and thereby prevented from becoming loose by the binding of the eccentric thumb-wheel 16 against the end wall of the slot 15, as before described. The pitch or inclination of the screw-threads of the jaw-locking spindle and those of the aperture c is very slight, so that the quarter-revolution of the spindle in locking the movable jaw will not affect the distance of the latter from the fixed jaw to any appreciable extent.

The above-described cam-shaped thumb-wheel affords an exceedingly simple and convenient means for accurately determining and limiting the oscillating movement of the spindle and simultaneously locking the same when turned to lock or unlock the movable jaw, which is essential to the quick and easy manipulation of the wrench.

Although the above-described wrench is especially adapted for nuts and bolts, it will be obvious that our invention may be applied equally as well to a pipe-wrench by a simple modification of the jaws to adapt them for the purpose.

What we claim as our invention, and desire to secure by Letters Patent, is—

1. In a wrench, the combination with a shank having a fixed jaw, of a movable jaw adapted to slide on said shank and having an aperture the walls of which are divided longitudinally into alternate plain and screw-threaded sections, an axially-oscillating locking-spindle fitting within said aperture of the movable jaw and supported at its lower end in a suitable bearing and having its upper portion divided longitudinally into plain and screw-threaded sections corresponding to those in the aperture of the movable jaw, the threaded sections of the spindle being adapted to engage the threaded sections of the said aperture, means for turning the spindle and limiting its movement in either direction and means for locking the spindle when at the end of its movement.

2. A wrench comprising a shank having a fixed jaw, a movable jaw adapted to slide on said shank and having an aperture the walls of which are divided longitudinally into alternate plain and screw-threaded sections, an axially-oscillating locking-spindle fitting within the aperture of the movable jaw and supported at its lower end in a suitable bearing and having at its upper end alternate plain and screw-threaded sections corresponding to those in the aperture of the movable jaw, the threaded sections of the spindle being adapted to engage the threaded sections in the said aperture, and a cam-shaped thumb-wheel secured to the locking-spindle and adapted to frictionally engage the adjacent wall of the slot in which it is placed to lock said spindle at the limit of its movement in either direction.

3. A wrench of the character described, comprising a shank having a handle and a fixed jaw, a movable jaw sliding on said shank and having an aperture the walls of which are divided longitudinally into plain and screw-threaded sections, an axially-oscillating locking-spindle fitting within said aperture and mounted in a bearing in the handle and provided at its upper end with short alternate plain and screw-threaded sections corresponding to those in the aperture of the movable jaw, a cam-shaped thumb-wheel fast on the spindle and arranged in a slot formed in a projection on the handle, the end wall of said slot forming a stop to arrest and frictionally hold and lock the cam-wheel and spindle when the latter is in position to lock the movable jaw on said shank, or when said spindle is at the end of its movement in the opposite direction to release the movable jaw.

Witness our hands this 15th day of December, A. D. 1903.

ROBERT A. HAMMOND.
FREDERICK E. WALDEN.

In presence of—
P. E. TESCHEMACHER.
J. E. MALONEY.